(12) United States Patent
Hartman

(10) Patent No.: US 8,334,893 B2
(45) Date of Patent: Dec. 18, 2012

(54) METHOD AND APPARATUS FOR COMBINING RANGE INFORMATION WITH AN OPTICAL IMAGE

(75) Inventor: Randolph G. Hartman, Plymouth, MN (US)

(73) Assignee: Honeywell International Inc., Morristown, NJ (US)

( * ) Notice: Subject to any disclaimer, the term of this patent is extended or adjusted under 35 U.S.C. 154(b) by 1076 days.

(21) Appl. No.: 12/267,139

(22) Filed: Nov. 7, 2008

(65) Prior Publication Data

US 2010/0118122 A1     May 13, 2010

(51) Int. Cl.
H04N 13/02     (2006.01)
(52) U.S. Cl. ............... 348/46; 348/47; 348/48; 348/49; 348/50
(58) Field of Classification Search .......... 348/46, 348/50
See application file for complete search history.

(56) References Cited

U.S. PATENT DOCUMENTS

| | | | |
|---|---|---|---|
| 5,801,760 A | 9/1998 | Uomori | |
| 6,111,979 A | 8/2000 | Katto | |
| 6,445,814 B2 | 9/2002 | Iijima et al. | |
| 6,587,183 B1 | 7/2003 | Uomori et al. | |
| 6,674,893 B1 | 1/2004 | Abe et al. | |
| 6,757,422 B1 | 6/2004 | Suzuki et al. | |
| 6,907,139 B2 | 6/2005 | Yamamoto | |
| 7,215,430 B2 * | 5/2007 | Kacyra et al. | 356/601 |
| 2003/0031327 A1 * | 2/2003 | Bakis et al. | 381/77 |
| 2003/0206653 A1 | 11/2003 | Katayama et al. | |
| 2004/0114033 A1 | 6/2004 | Eian et al. | |
| 2004/0151350 A1 * | 8/2004 | Tafuku et al. | 382/116 |
| 2005/0207486 A1 | 9/2005 | Lee et al. | |
| 2007/0076089 A1 | 4/2007 | DePue et al. | |
| 2007/0247612 A1 * | 10/2007 | Pack et al. | 356/4.01 |
| 2007/0269102 A1 | 11/2007 | Wang | |
| 2008/0031327 A1 * | 2/2008 | Wang et al. | 375/240.12 |
| 2008/0112610 A1 | 5/2008 | Israelsen et al. | |
| 2008/0228450 A1 * | 9/2008 | Jakobsen et al. | 703/2 |

FOREIGN PATENT DOCUMENTS

| | | |
|---|---|---|
| EP | 2131597 | 12/2009 |
| JP | 08070473 | 8/1994 |
| JP | 2000253422 | 3/1999 |
| JP | 2001133231 | 11/1999 |
| JP | 2002077944 | 9/2000 |
| WO | 2008084468 | 7/2008 |

OTHER PUBLICATIONS

UK Intellectual Property Office, "International Search Report", Jan. 22, 2010, Published in: GB.

* cited by examiner

Primary Examiner — Djenane Bayard
(74) Attorney, Agent, or Firm — Fogg & Powers LLC

(57) ABSTRACT

A method for combining range information with an optical image is provided. The method includes capturing a first optical image of a scene with an optical camera, wherein the first optical image comprising a plurality of pixels. Additionally, range information of the scene is captured with a ranging device. Range values are then determined for at least a portion of the plurality of pixels of the first optical image based on the range information. The range values and the optical image are combined to produce a 3-dimensional (3D) point cloud. A second optical image of the scene from a different perspective than the first optical image is produced based on the 3D point cloud.

12 Claims, 3 Drawing Sheets

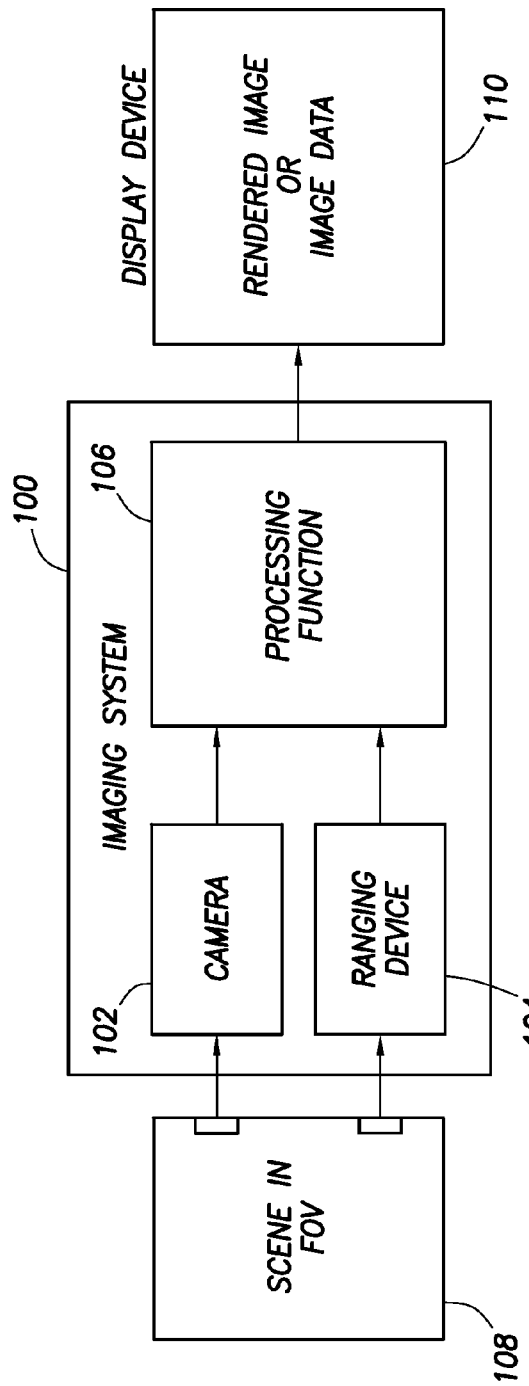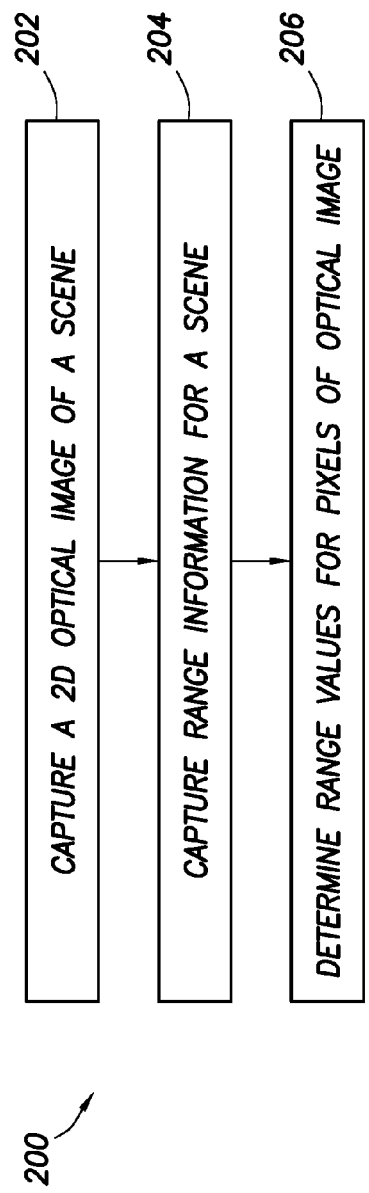

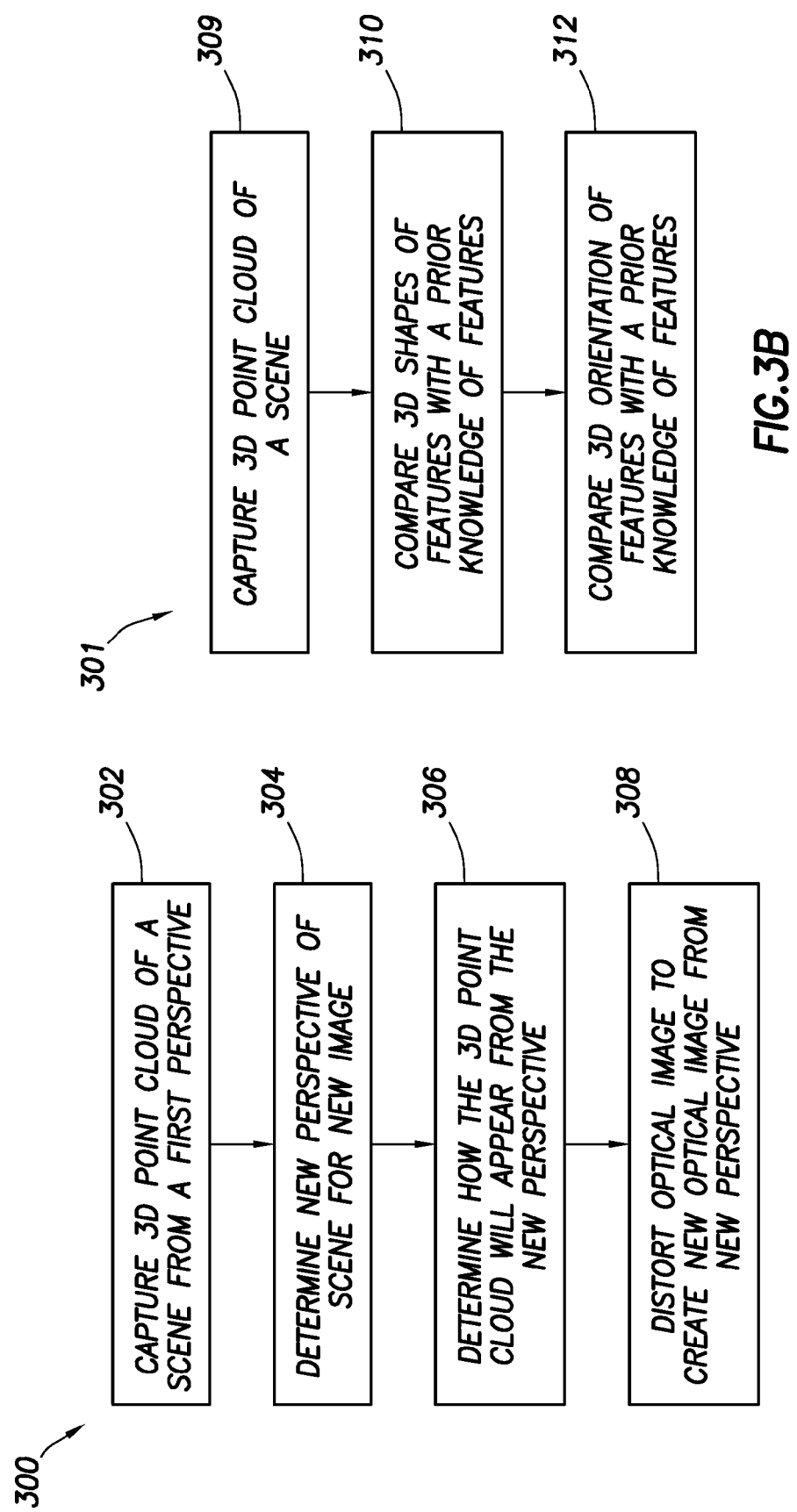

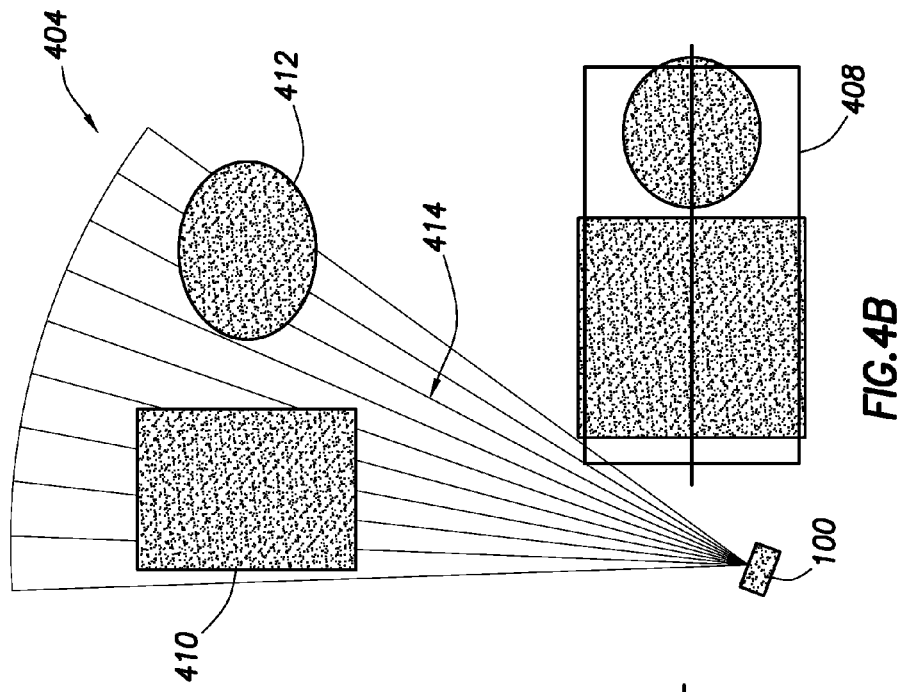
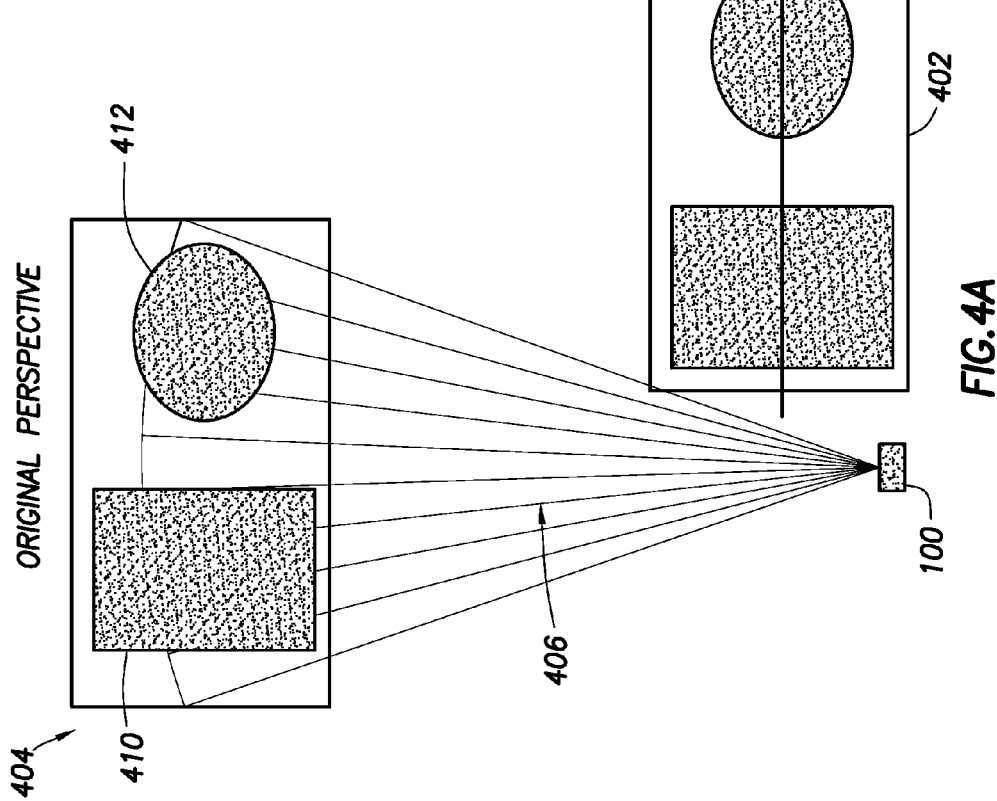
FIG.4B
FIG.4A

METHOD AND APPARATUS FOR COMBINING RANGE INFORMATION WITH AN OPTICAL IMAGE

BACKGROUND

Currently there are devices that capture range information for a scene. One example of such a device is a light detection and ranging (LIDAR) device. LIDAR devices are sometimes referred to in the art as laser detection and ranging (LADAR) devices, although both acronyms refer to the same device. A LIDAR captures range information for a scene by emitting a flash of coherent light and measuring the amount of time it takes the coherent light to travel from the LIDAR to objects within the field of view of the LIDAR and back to the LIDAR. This is known as a flash LIDAR. Another type of LIDAR is a scanning LIDAR where a single beam of light is scanned across a scene. In either case, the LIDAR returns packets of timing information which may then be compiled into a matrix (referred to herein as a range matrix). Each data point of the range matrix corresponds to the amount of time taken by the coherent light to bounce off of an object located at that data point. The range matrix produced from the output of the LIDAR is a 2-dimensional map of the range information received.

Many devices also exist that capture optical information for a scene. One of the most common examples of a device that captures optical information is a traditional camera. Cameras capture optical information in the form of a 2-dimensional map of the optical information received at the camera from within the field of view of the camera. For example, a visual spectrum optical camera captures and records light within the visual spectrum that reflects off of objects within the field of view of the camera.

Visual spectrum optical cameras have been used to create stereo vision systems in an attempt to better replicate the human vision experience of viewing the world from two perspectives (a left and a right eye). Images or videos created in this manner are sometimes referred to as 3-dimensional (3D) images or videos. These 3D optical images are based on taking two 2D optical images of a single scene from two different perspectives. One optical image is taken from a perspective of a left eye and the other image is taken from a perspective of a right eye. A typical 3D camera consists of two lenses which are spaced apart at approximately the distance of a human's eyes. The 3D camera takes two 2D images simultaneously, one with the left lens and one with the right lens.

Special techniques are used to display the two images on a single screen and to give the viewer the impression that the left eye is viewing one image and the right eye is viewing the other image. For example, one method of viewing the two images requires the viewer to wear glasses having one red colored lens and one blue colored lens. Then the left eye image is shown in blue simultaneous with right eye image which is shown in red. With the glasses on, the viewer's left eye picks up on the left blue images and the viewer's right eye picks up on the right red images. The viewer's brain then puts them together to create the real life 3D effect. This effect can be used in either a still photograph or a video setting.

Another method of viewing 3D images is similar except that instead of red and blue images for the left and right eye, polarized images are used. Here, the left images are polarized in one direction and the right images are polarized at a 90 degree angle from the left images. The user then wears glasses with a left lens matching the polarization of the left image and a right lens matching the polarization of the right image.

A third method for viewing 3D videos involves alternating the left and right images from the camera on the viewing screen. Here, the viewer's brain forms the alternating images into a 3D image.

SUMMARY

The following summary is made by way of example and not by way of limitation. In one embodiment, a method for combining range information with an optical image is provided. The method includes capturing a first optical image of a scene with an optical camera, wherein the first optical image comprising a plurality of pixels. Additionally, range information of the scene is captured with a ranging device. Range values are then determined for at least a portion of the plurality of pixels of the first optical image based on the range information. The range values and the optical image are combined to produce a 3-dimensional (3D) point cloud. A second optical image of the scene from a different perspective than the first optical image is produced based on the 3D point cloud.

DRAWINGS

FIG. 1 is a block diagram of one embodiment of an imaging system for combining an optical image and range information;

FIG. 2 is a flow chart of one embodiment of a method for combining an optical image and range information using the imaging system of FIG. 1.

FIG. 3A is a flow chart of one embodiment of a method for using the combination of the optical image and range information from FIG. 2;

FIG. 3B is a flow chart of another embodiment of a method for using the combination of the optical image and range information from FIG. 2

FIG. 4A is an illustration of using the imaging system of FIG. 1 at a first perspective with respect to a scene and an optical image resulting from this first perspective; and FIG. 4B is an illustration of using the imaging system of FIG. 1 at a second perspective with respect to the scene and a hypothetical optical image resulting from this second perspective.

DETAILED DESCRIPTION

FIG. 1 is one embodiment of a system 100 for combining an optical image with range information. System 100 includes a 2-dimensional (2D) optical camera 102, a ranging device 104, and a processing system 106.

Optical camera 102 captures a 2D optical image of a scene 108 which is in the field of view of camera 102. Optical camera 102 may capture scene 108 as a black and white, grayscale, full color or other type of image. Additionally, optical camera 102 may have any resolution as desired for a particular application. Optical camera 102 captures optical information in the form of a 2-dimensional map of the optical information received at optical camera 102 from within the field of view of optical camera 102. In this embodiment, optical camera 102 is a visual spectrum optical camera that captures and records light within the visual spectrum that reflects off of objects within the field of view of optical camera 102. In one embodiment, optical camera 102 is a still camera that captures still images of a scene. In another embodiment, optical camera 102 is a video camera which captures multiple images over time in a frame-by-frame manner to produce a video.

Ranging device 104 captures range information for the field of view of ranging device 104. In one embodiment ranging device 104 is a light detection and ranging (LIDAR) device. One form of a LIDAR captures range information for a scene by emitting a flash of coherent light and measuring the amount of time it takes the coherent light to travel from the LIDAR to objects within the field of view of the LIDAR and back to the LIDAR. This is known as a flash LIDAR. Another type of LIDAR is a scanning LIDAR where a single beam of light is scanned across a scene. As mentioned in the background section, LIDAR devices are also referred to in the art as laser detection and ranging (LADAR) devices. In other embodiments, ranging device 104 is a radio detection and scanning (RADAR) device, a sound and navigation ranging (SONAR) device, a time of flight camera, and a DOPPLER based device.

In either case, ranging device 104 returns packets of timing information which may then be compiled into a matrix of range information (referred to herein as a range matrix). Each data point of the range matrix corresponds to the amount of time taken by the coherent light to bounce off of an object aligned with the pixel. The range matrix produced from the output of the ranging device 104 is a 2-dimensional map of the range information received for each pixel. In addition to the range information, ranging device 104 also captures an intensity matrix for the field of view of ranging device 104. The intensity matrix represents a measure of the intensity of the coherent light received at ranging device 104 within each data point across the field of view. Similar to the range information, the intensity information captured by ranging device 104 is compiled in the form of a matrix of intensity information of information across the field of view.

Processing system 106 includes at least one programmable processor (referred to herein as "processor") and at least one storage medium that is communicatively coupled to the processor. In one embodiment, the processor comprises a microprocessor. The processor executes various items of software. The software comprises program instructions that are embodied on one or more items of processor-readable media. For example, processor readable media includes the at least one storage medium which may comprise a hard disk drive or other mass storage device local to processing system 106 and/or shared media such as a file server that is accessed over a network such as a local area network or wide area network such as the Internet. In one embodiment, the software is firmware which is embedded in the storage medium within the processor. Optical camera 102 and ranging device 104 are communicatively coupled to processing system 106. Processing system 106 receives optical image data from optical camera 102 as well as intensity and/or range matrix data from ranging device 104. Processing system 106 then outputs a rendered image or image data to a display 110.

Optical camera 102 and ranging device 104 are oriented such that at least a portion of the field of view of each device overlaps. In one embodiment, optical camera 102 and ranging device 104 are aligned such that the field of view of each device is substantially the same. Further, in one embodiment, optical camera 102 and ranging device 104 are mounted in a fixed relationship to one another such that the field of view of each device remains the same relative to the other device.

FIG. 2 illustrates one embodiment of a method 200 of combining range information with an optical image using system 100. Method 200 begins at block 202 where a 2D optical image of scene 108 is captured by optical camera 102. At block 204, range information for scene 108 is captured by ranging device 104. When scene 108 contains moving objects, the optical image and the range information are captured at the same time to ensure that the moving objects are captured in the same position in both the optical image and the range information. When scene 108 contains only non-moving objects, the optical image and the range information may be captured at different times. The optical image comprises a plurality of pixels, each pixel comprising data representing the color or shade of scene 108 at a position within the field of view of optical camera 102. As described above, the range information from ranging device 104 is in the form of a range matrix that comprises a plurality of data points. Each data point of the range matrix represents range information for scene 108 within the field of view of ranging device 104.

At block 206 range values are determined for the pixels of the optical image based on the range matrix. To determine range values for the pixels of the optical image, processing system 106 correlates the data points in the range matrix with the pixels in the optical image. In one embodiment, optical camera 102 and ranging device 104 are co-located such that each device has an identical field of view at an identical angle. In another embodiment, optical camera 102 and ranging device 104 are mounted adjacent to one another. This results in each device capturing scene 108 from a slightly different angle. Regardless of the relative location of optical camera 102 and ranging device 104, the following process may be used to correlate the pixels in the optical image with the data points in the range matrix.

The correlation between the range matrix and the optical image is a data point to pixel correlation that is based on an initial correlation of optical camera 102 and ranging device 104. To initially correlate optical camera 102 and ranging device 104, information captured by each device is compared to determine which data points of ranging device 104 correspond to which pixels in an image from optical camera 102. For example, in one embodiment, both optical camera 102 and ranging device 104 are mounted in a fixed location such that the field of view of each device overlaps. Then, portions (or all) of the information from each device are compared. In one embodiment, a checkerboard pattern is placed within the portion of the field of view of each device that overlaps for comparison of the images. The checkerboard pattern comprises a grid of squares which alternate light and dark in color. This pattern is readily recognizable in both the optical image from camera 102 and the intensity matrix from ranging device 104. Optical camera 102 and ranging device 104 each capture an image of the checkerboard pattern. As mentioned above, along with the range matrix, ranging device 104 captures a light intensity matrix comprising a plurality of data points which represent light intensity data.

From the light intensity matrix of ranging device 104 the checkerboard pattern can be ascertained. The position and location of the checkerboard pattern within the light intensity matrix is then compared with the position and location of the checkerboard pattern within the optical image captured by optical camera 102. In this way it is then determined which pixels of the optical image match up with which data points of the intensity matrix. This initial correlation (for the given position of optical camera 102 and ranging device 104) determines which data points within the intensity matrix corresponds to which pixel or pixels within the optical image. Since the intensity matrix and the optical image may have different resolutions or may not be positioned in exact alignment, data points from the intensity matrix may be extrapolated and averaged over several pixels in the optical image. Thus, a single intensity data point may be matched to multiple pixels in the optical image. Furthermore, a single pixel within the optical image may be matched to an average of neighboring intensity data points. Although in this embodiment a checkerboard pattern was used to compare the images in other embodiments, other patterns or the like are used, including, but not limited to lines or other shape outlines.

Once the initial correlation between the optical image and the intensity matrix is completed, the correlation between the optical image and the range matrix is determined. Correlation between the optical image and the range matrix is the same correlation as between the optical image and the intensity matrix, because the data points in the range matrix are aligned with the data points in the intensity matrix.

In one embodiment, the initial correlation is performed when optical camera 102 and ranging device 104 are initially mounted and aligned. Here, a correlation between optical camera 102 and ranging device 104 may be used to improve the alignment between optical camera 102 and ranging device 104. To mount and align optical camera 102 and ranging device 104, an initial alignment is performed such that ranging device 104 and optical camera 102 generally have the same field of view. Then a correlation between an optical image of the checkerboard and an intensity matrix of the checkerboard is performed. Once the data points of the intensity matrix and the optical image are compared, optical camera 102 and ranging device 104 may be repositioned if improved alignment is desired. Then the correlation using the checkerboard pattern is completed again to re-correlate the optical image with the intensity matrix. The compare, re-align, and correlate cycle can be completed as many times as necessary to achieve the desired alignment between optical camera 102 and ranging device 104. In other embodiments, other procedures may be used to align optical camera 102 and ranging device 104.

In any case, once the initial correlation between the optical image and the range matrix is known for a fixed location of optical camera 102 with respect to ranging device 104, processing system 106 uses the initial correlation to determine a range value for each pixel within the optical image. Using the data point-to-pixel mapping from the initial correlation, processing system 106 assigns one or more range values from the range matrix and to each pixel the optical image. The combination of information generated by assigning a range value to each pixel within the optical image is referred to herein as a 3D point cloud.

In one embodiment, the process of assigning range values for each pixel is made more robust by performing range and optical image analysis over a series of range matrix and optical images captured of the same scene.

Referring now to FIG. 3A, one embodiment of a method 300 for producing a new optical image at a different perspective than an original optical image is shown. Method 300 uses imaging system 100 to produce the new optical image. The new optical image is a fabricated 2-dimensional optical image that is based on an original optical image captured by imaging system 100. Method 300 begins with the combined optical image and range values from block 206 of method 200. The combination of the range values and optical image are used to create a new image from a different perspective than the original image captured by optical camera 102. As used herein, a different perspective means that the new image is produced as if optical camera 102 where at a different angle relative to the scene than the actual angle in which optical camera 102 captured the original image. In other words, a line of sight between the hypothetical location of a camera for the new image and the scene is different than the line of sight between the camera and the scene for the original image.

Method 300 begins at block 302 where a 3-dimensional point cloud for a scene is captured by imaging system 100. The 3-dimensional point cloud is captured as described with respect to method 200 above. FIG. 4A illustrates one embodiment of an original image 402 captured by imaging system 100 of scene 404. Imaging system 100 captures an optical image 402 of scene 404. Imaging system 100 also captures range information for scene 402. Lines 406 illustrate ranging signals sent from imaging system 100 to objects within scene 404. As described above, the ranging data received is combined with the image captured to produce a 3D point cloud for scene 404.

Next, at block 304 imaging system 100 determines what the perspective of scene 404 will be in the newly created image. For example, FIG. 4B illustrates an example embodiment of scene 404 as hypothetically captured by imaging system 100 from a new perspective. The new perspective of scene 404 is provided to image system 100 from an outside program to, for example, illustrate scene 404 to another user at a different angle as explained below.

At block 306, imaging system 100 determines how the new perspective for the hypothetical image of scene 404 from the new perspective will appear. Imaging system determines the appearance of the hypothetical image based on the original 3D point cloud. From the original 3D point cloud, imaging system 100 calculates what the original 3D point cloud would look like from the new perspective.

Once imaging system 100 determines what the new 3D point cloud would appear as in a 2D image from the new perspective, at block 308, imaging system 100 distorts the original image such that features have a shape as would be expected from the new perspective. For example, optical image 402 is an original 2D image. FIG. 4B illustrates a newly fabricated image 408 of scene 404 from a new, hypothetical, perspective. Scene 404 comprises a rectilinear shaped feature 410 and an elliptical feature 412. From the perspective of imaging system 100 in FIG. 4A, an optical camera captures optical image 402 of scene 404. Lines 414 in FIG. 4B illustrate how ranging signals and light to/from imaging system 100 would capture scene 404 if imaging system 100 were placed in the hypothetical new perspective. From the new perspective it is evident that rectilinear feature 410 is touched by four rays on the front face from the original perspective shown in FIG. 1. From the new perspective, however, rectilinear feature 410 is touched by five rays on the front face. Thus, rectilinear feature 414 is wider in image 408 than in image 402. Similarly, elliptical feature 412 has a slightly different shape from the new perspective as shown in image 408. Additionally, from the new perspective the space between rectilinear feature 410 and elliptical feature 412 has been reduced. Again as illustrated by the space between the lines 406 that contact features 410, 412 from the original perspective and the space between the lines 414 that contact features 410, 412 from the new perspective, the space between features 410, 412 is reduced in new image 408.

Due to the distortion and potentially unknown data from the new perspective of new image 408, there may be errors within new image 408. These errors may appear as visual distortions in new image 408 as compared to an actual original image from the perspective shown in FIG. 4B. The smaller the change in angle from the original perspective to the new perspective the less estimation that is needed and the less potential for distortion in the new image. In contrast, large changes in perspective require larger amounts of estimation and can cause large distortions in the new image. Due to the resulting distortion there may be situations in which the angle of change between the original perspective and the new perspective is limited based on the particular application for new image 408.

Producing a new image from a different perspective based on an original optical image and a range imaging can have many applications. For example, in one embodiment, an image captured from one perspective can be converted to an image as would have been captured from another perspective to aid in identifying objects or places.

In one embodiment, imaging system 100 and methods 200 and 300 are used to create a 3-dimensional optical image. As used herein, a 3-dimensional optical image refers to two 2D optical images of a single scene from two different perspectives, wherein the perspectives are approximately a distance between a viewer's eyes apart. This is sometimes referred to as a stereo vision image, and is an attempt to better replicate the human vision experience of viewing the world from two perspectives simultaneously (a left eye perspective and a right eye perspective).

Here, a first image of a scene is captured from a first perspective with imaging system 100. Then, a second image of the scene is created from a second perspective in the manner described in methods 200 and 300. In one embodiment, the second perspective is approximately an eye distance away from the first perspective. This second image is then used for as the view from one of the viewer's eyes and the first image is used as the view from the other of the viewer's eyes. The combination of the two 2D optical images creates a 3D optical image. In another embodiment, the second perspective is a larger distance away from the first perspective (e.g. 10 degrees). Then, a third new image of the scene is created from the third perspective in the manner described in methods 200 and 300. The third perspective is approximately an eye distance away from the first perspective. The 3D image is then created from the second image and the third image. Thus, the second image is then used as the view from one of the viewer's eyes and the third image is used as the view from the other of the viewer's eyes.

Methods 200 and 300 may be applied in a video by repeating the steps of methods 200 and 300 for each frame of a frame-by-frame video. Each frame of the frame-by-frame video is captured with imaging system 100 and processed through the steps of methods 200 and 300. The resulting new frames are then shown in a frame-by-frame manner for the new video.

Another application for methods 200 and 300 includes producing a video or portions of a video from a perspective different from the perspective that the video was originally shot. Here, the video may be shot from one perspective with imaging system 100, and during editing portions of the video may be modified to be shown from a different perspective without having to re-shoot the particular scenes.

Additionally, in one embodiment, imaging system 100 and methods 200 and 300 are used to create a 3D video. Here, the video is filmed from a single perspective with imaging system 100. Then, one or two additional perspectives may be created and used for the left eye and right eye images in the 3D video. For example, the video may be filmed from a perspective that is the desired center point between the left and right eyes of the viewer. Then two new images may be created based on the original image. One image is slightly to the right of the filmed image and the other image is slightly to the left of the filmed image. Advantageously, this method of producing a 3D video produces two images with little distortion because the perspective change for both the left and the right image from the center filmed image is small. In another embodiment, the filmed image is used as one eye and a new image is created for the other eye. Thus, in this embodiment only one new image is created to create the 3D video.

Referring now to FIG. 3B, one embodiment of another method 301 is shown. In method 301 the combination of the range information and the optical image is used for feature recognition. Blocks 202-206 of method 200 precede blocks 302-304 where at block 309 a 3D point cloud for a scene is captured. Then, the feature recognition shown in blocks 310-312 occurs. In one embodiment processing system 106 has a priori knowledge of the 3D shapes of features. At block 310, processing system 106 then uses the determined 3D shapes for features within optical image 402 and compares the 3D shapes to known features in an attempt at feature recognition. This method may be done in conjunction with a standard feature recognition algorithm or without a standard feature recognition algorithm. In addition to (or instead of) comparison of the 3D shapes, at block 312, processing system 106 uses the orientation of faces within the optical image as determined at block 304, and compares the orientation of the faces with a priori knowledge about the orientation of faces of known features. For example, a known feature may comprise a square face on one component which is at approximately a 45 degree angle relative to a cylindrical component and half of the size of the cylindrical component. The feature recognition algorithm then looks for this type of 3-dimensional feature within an optical image in an attempt to find a match within the optical image.

Although specific embodiments have been illustrated and described herein, it will be appreciated by those of ordinary skill in the art that any arrangement, which is calculated to achieve the same purpose, may be substituted for the specific embodiments shown. It is manifestly intended that any inventions be limited only by the claims and the equivalents thereof.

What is claimed is:

1. A method for combining range information with an optical image, the method comprising:
capturing a first optical image of a scene from a first perspective with an optical camera, the first optical image comprising a plurality of pixels;
capturing range information of the scene with a ranging device;
determining range values for at least a portion of the plurality of pixels of the first optical image based on the range information;
combining the range values and the first optical image to produce a 3-dimensional (3D) point cloud having the first perspective;
determining a second perspective of the scene for a second image;
determining how the 3D point cloud will appear from the second perspective of the scene for the second image; and
distorting the first optical image to create the second image.

2. The method of claim 1, further comprising:
creating a 3D image from the first optical image and the second image.

3. The method of claim 1, further comprising:
producing a third image of the scene from a third perspective; and
creating a 3D image from the second image and the third image.

4. The method of claim 1, wherein the optical image is an image that captures a visual spectrum of light that is reflected off of objects within the scene.

5. The method of claim 1, wherein the ranging device is selected from a group consisting of: a LIDAR, a RADAR, a SONAR, a time of flight camera, and a DOPPLER.

6. The method of claim 1, wherein the first optical image and the range information are captured at substantially the same time.

7. An imaging system comprising:
- a processing system having a programmable processor and a storage medium;
- an optical camera communicatively coupled to the processing system; and
- a ranging device communicatively coupled to the processing system;
- wherein the optical camera and the ranging device are oriented such that the field of view of the optical camera is substantially the same as the field of view of the ranging device;
- wherein the processing system is configured to produce a first new image of a scene at a perspective that is different than a perspective of an original optical image of the scene captured by the optical camera based on the original optical image and range information captured by the ranging device, the first new image produced by:
  - combining the range information and the original optical image to produce a 3-dimensional (3D) point cloud having the perspective of the original optical image;
  - determining the perspective of the scene of the first new image;
  - determining how the 3D point cloud will appear from the perspective of the scene of the first new image; and
  - distorting the original optical image to create the first new image.

8. The system of claim 7, wherein the processing system is further configured to create a 3D image with the original optical image and the first new image.

9. The system of claim 7, wherein the processing system is further configured to:
- produce a second new image of the scene from a third perspective; and
- create a 3D image from the first new image and the second new image.

10. The system of claim 7, wherein the optical camera is configured to capture an optical image of a visual spectrum of light that is reflected off of objects within the scene.

11. The system of claim 7, wherein the ranging device is selected from a group consisting of: a LIDAR, a RADAR, a SONAR, a time of flight camera, and a DOPPLER.

12. The system of claim 7, further comprising a display device communicatively coupled to the processing system and remote from the processing system, wherein the original optical image is captured from a perspective of a first user, and the display device is configured to display the first new image to a second user, wherein the first new image is produced from a perspective of the second user.

* * * * *